United States Patent
Chao

(10) Patent No.: US 6,433,450 B1
(45) Date of Patent: Aug. 13, 2002

(54) POWER GENERATING SYSTEM WITH PHYSICAL ENERGY TO ENHANCE OUTPUT

(76) Inventor: Wen-Ping Chao, No. 8, Lane 27, Sec. 3, Chung-Yang Road., Sanchung City, Taipei Hsien (TW)

( * ) Notice: Subject to any disclaimer, the term of this patent is extended or adjusted under 35 U.S.C. 154(b) by 0 days.

(21) Appl. No.: 09/722,288

(22) Filed: Nov. 28, 2000

(51) Int. Cl.$^7$ ............................ H02K 47/14; H02K 7/02
(52) U.S. Cl. .................. 310/113; 310/74; 290/4 C; 74/572; 322/13; 322/9; 322/4
(58) Field of Search ................. 370/112, 113, 370/114, 74, 75 R, 80, 83, 101, 102 R; 290/4 C, 27, 30 A, 47; 74/572; 363/104; 318/150, 161; 322/13, 9, 4, 23, 32, 36, 38, 39

(56) References Cited

U.S. PATENT DOCUMENTS

| | | | |
|---|---|---|---|
| 948,817 A | * 2/1910 | Lewis | .......................... 310/113 |
| 3,221,172 A | * 11/1965 | Rolison | ....................... 310/113 |
| 3,609,426 A | * 9/1971 | Gaul | ........................... 310/112 |
| 3,622,840 A | * 11/1971 | Kahn | ......................... 317/114 |
| 3,861,485 A | * 1/1975 | Busch | ....................... 180/65 R |
| 4,800,311 A | * 1/1989 | Weldon et al. | ............... 310/178 |

OTHER PUBLICATIONS

Sears et al., University Physics, Addition–Wesley Publishing Company, Sixth edition, pp. 349–350.*

* cited by examiner

Primary Examiner—Nestor Ramirez
Assistant Examiner—Dang Dinh Le
(74) Attorney, Agent, or Firm—Bacon & Thomas, PLLC

(57) ABSTRACT

A power generating system. The system enhances output, in which a motor of about 700 W to 750 W produces horsepower to rotate a power generating unit, causing the power generating unit to produce electricity, and a transmission device is coupled between the motor and the power generating unit to increase the horsepower of the motor to the power generating unit two to three times by the application of inertia force and lever force.

8 Claims, 4 Drawing Sheets

POWER GENERATING SYSTEM WITH PHYSICAL ENERGY TO ENHANCE OUTPUT

BACKGROUND OF THE INVENTION

The present invention relates to a power generating system and, more particularly, to such a power generating system, which uses inertia force and lever force to increase the torque of a motor to rotate the rotor of a power generating unit, so as to greatly enhance the output of the power generating unit.

Continuous consumption of energy (for example, gasoline) causes shortage of natural resources. In order to satisfy the demand for energy, different power generating methods have been developed. These power generating methods use nuclear power, thermal power, hydraulic power, wind power, sun energy, or sea wave power to rotate a rotor, to further cause a magnetic induction. The revolving speed determines the output of the power generating system. The faster the revolving speed of the rotor is, the more the output of the power generating system will be. Therefore, for generating electricity, energy (force) is needed to rotate the rotor of the power generating system.

Using an electric motor to drive a power generator to generate electricity have been utilized, however, if the electric motor consumes about 100,000 W, the electric current output of the power generator may be below 100,000 W because power loss is inevitable during its transmission. A power generator has industrial value only when its electric current output surpasses the power consumption of the motor. In order to increase the electric current output of the power-generating unit to the extent that sufficient amount is still available when deducted by the power consumption of the motor and the transmission loss, a special measure must be employed.

SUMMARY OF THE INVENTION

It is the main object of the present invention to provide a power generating system, which uses inertia force and lever force to enhance the torque of a motor, so as to increase power-generating output. To achieve this and other objects of the present invention, the power generating system comprises a motor, an idle wheel coupled to and rotated by the motor, a transmission mechanism coupled between the motor and the idle wheel for enabling the idle wheel to be rotated by the motor; a power generating unit rotated by the idle wheel to generate electricity, the power generating unit comprising a power cable for output of generated electricity; and a power transmission unit connected to the power cable of the power generating unit for controlling output of electricity from the power generating unit. The transmission mechanism between the motor and the idle wheel can be a reduction gear, or a belt transmission mechanism.

DETAILED DESCRIPTION OF THE PREFERRED EMBODIMENT

Figure 1:
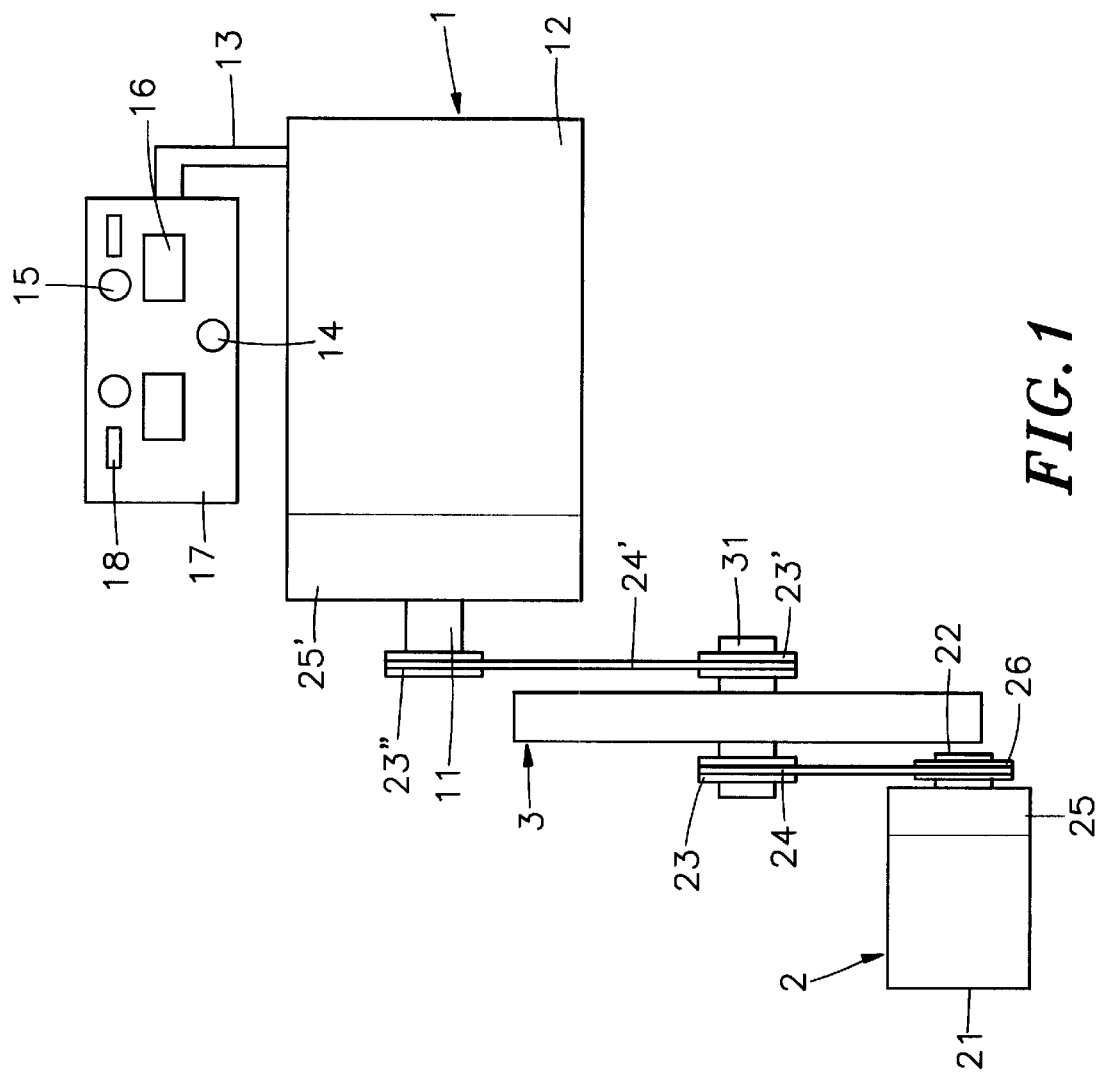
FIG. 1 illustrates the arrangement of the power generating system according to the present invention.
Figure 2:
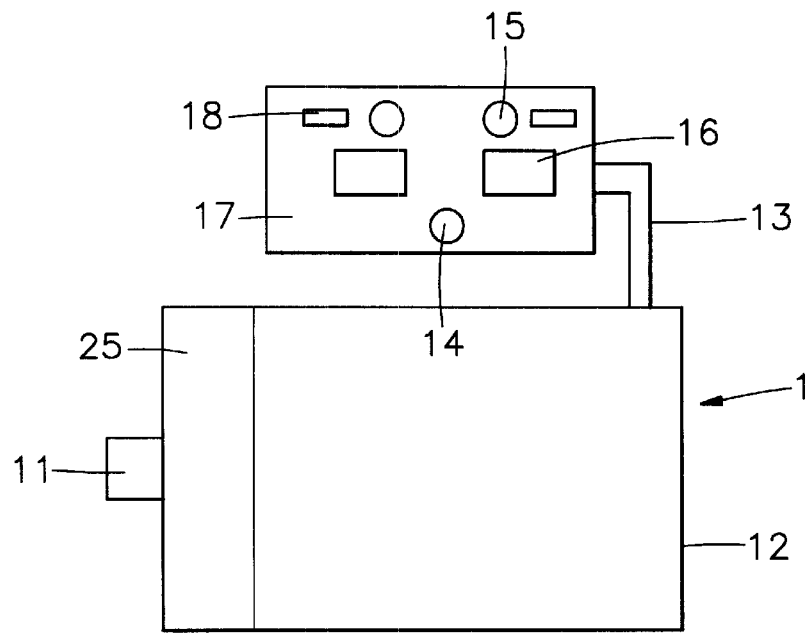
FIG. 2 illustrates the arrangement of the power generating unit and the power transmission unit according to the present invention.
Figure 3:
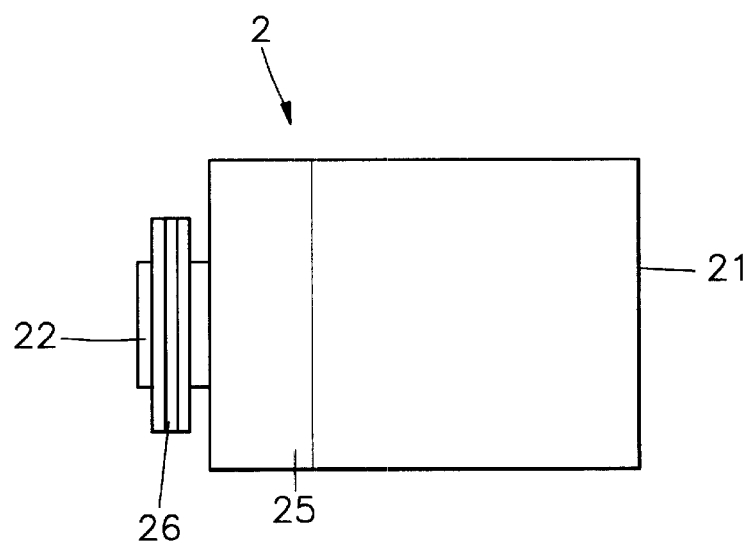
FIG. 3 illustrates the arrangement of the motor, the first reduction gear, and the one-way gear wheel according to the present invention.

Referring to FIGS. from 1 through 3, the present invention uses physical energy to enhance the speed and torque of a motor 2, enabling a power generating unit 1 to output more electricity.

The prime power of the power generating system is the motor 2. A first reduction gear 25 is fixedly mounted on a first transmission shaft 22 and coupled to the rotor inside the shell 21 of the motor 2, and driven by the motor 2 to rotate the first transmission shaft 22 and an one-way gear wheel 26 on the first transmission shaft 22. A first sprocket 23 is fixedly mounted on one end of the wheel shaft 31 of an idle wheel 3, and coupled to the one-way gear wheel 26 through a first chain 24. A second sprocket 23' is fixedly mounted on the other end of the wheel shaft 31 of the idle wheel 3 and coupled to a third sprocket 23" through a second chain 24'. The third sprocket 23" is fixedly mounted on a second transmission shaft 11. A second reduction gear 25' is coupled between the second transmission shaft 11 and the rotor in side the shell 12 of a power generating unit 1.

When rotated by the motor 2, the idle wheel 3 gradually produces torque, and the revolving speed of the idle wheel 3 is gradually increased. Because much power is required to rotate the idle wheel 3 at the initial stage, the invention uses the first reduction gear 25 to increase the torque of the motor 2, so as to efficiently rotate the idle wheel 3. Due to the reduction ratio of the first reduction gear 25, the torque of the motor 2 is greatly increased, and therefore the idle wheel 3 can be rotated quickly. When rotated, the revolving speed of the idle wheel 3 is. soon increased, and the torque of the motor 2 is relatively increased.

Figure 4:
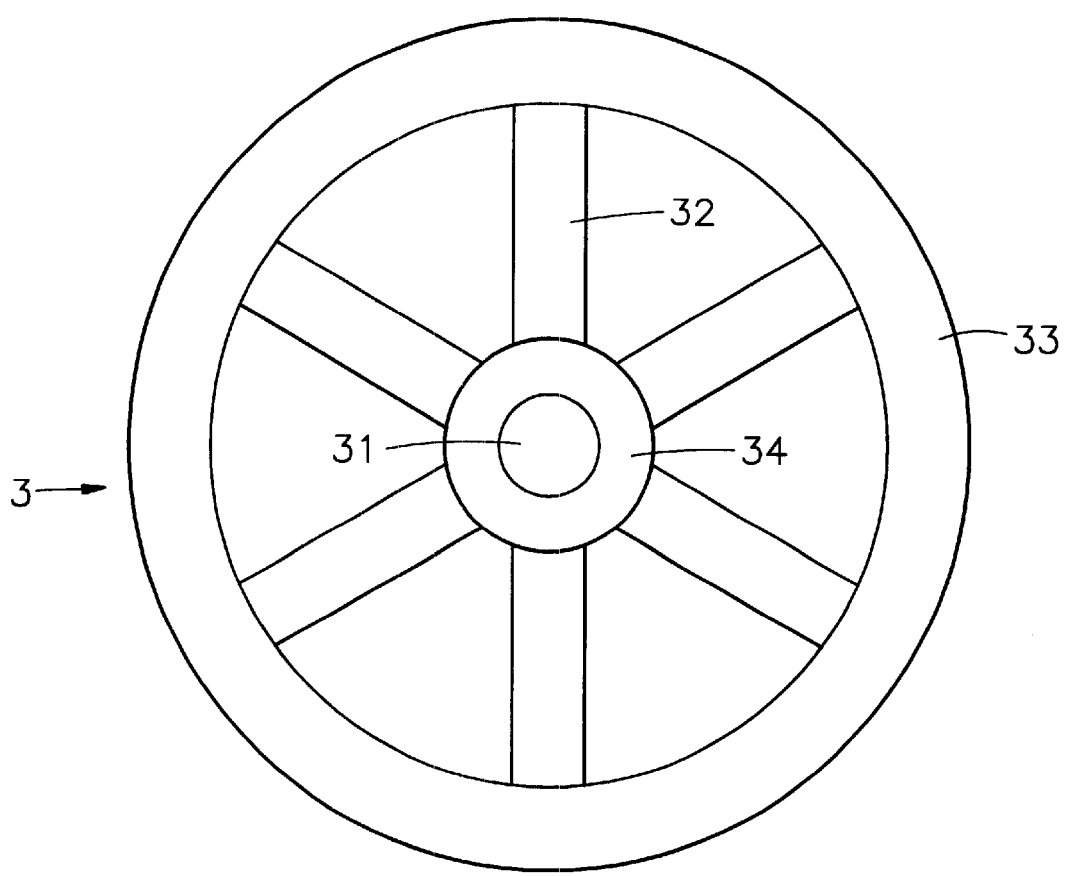
FIG. 4 is a front view of the idle wheel according to the present invention.
Figure 5:
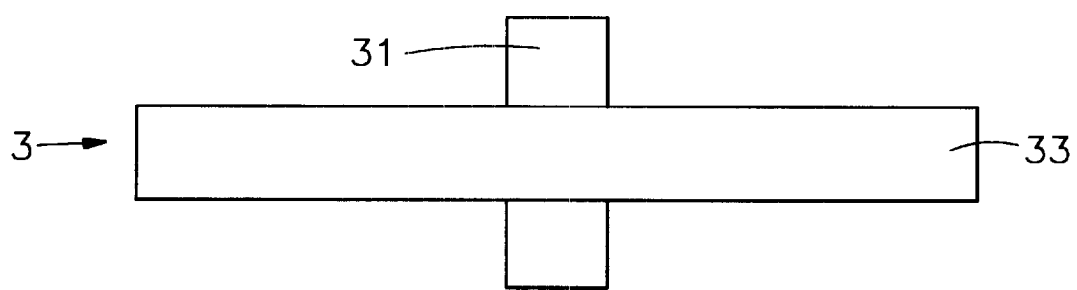
FIG. 5 is a side view of the idle wheel according to the present invention.

Referring to FIGS. 4 and 5 and FIG. 1 again, in addition to inertia force, the idle wheel 3 also produces lever force to increase the torque. The outer race 33 of the idle wheel 3 is the force, which is transmitted to the fulcrum 34 at the wheel shaft 31 for turning the second transmission shaft 11 and then the rotor of the power generating unit 1 via the second reduction gear 25'. Therefore, much torque is produced to rotate the rotor of the power-generating unit 1, causing the power-generating unit 1 to produce electricity efficiently. Generated electricity can be used to rotate the motor 2 and for other purposes.

Figure 6:
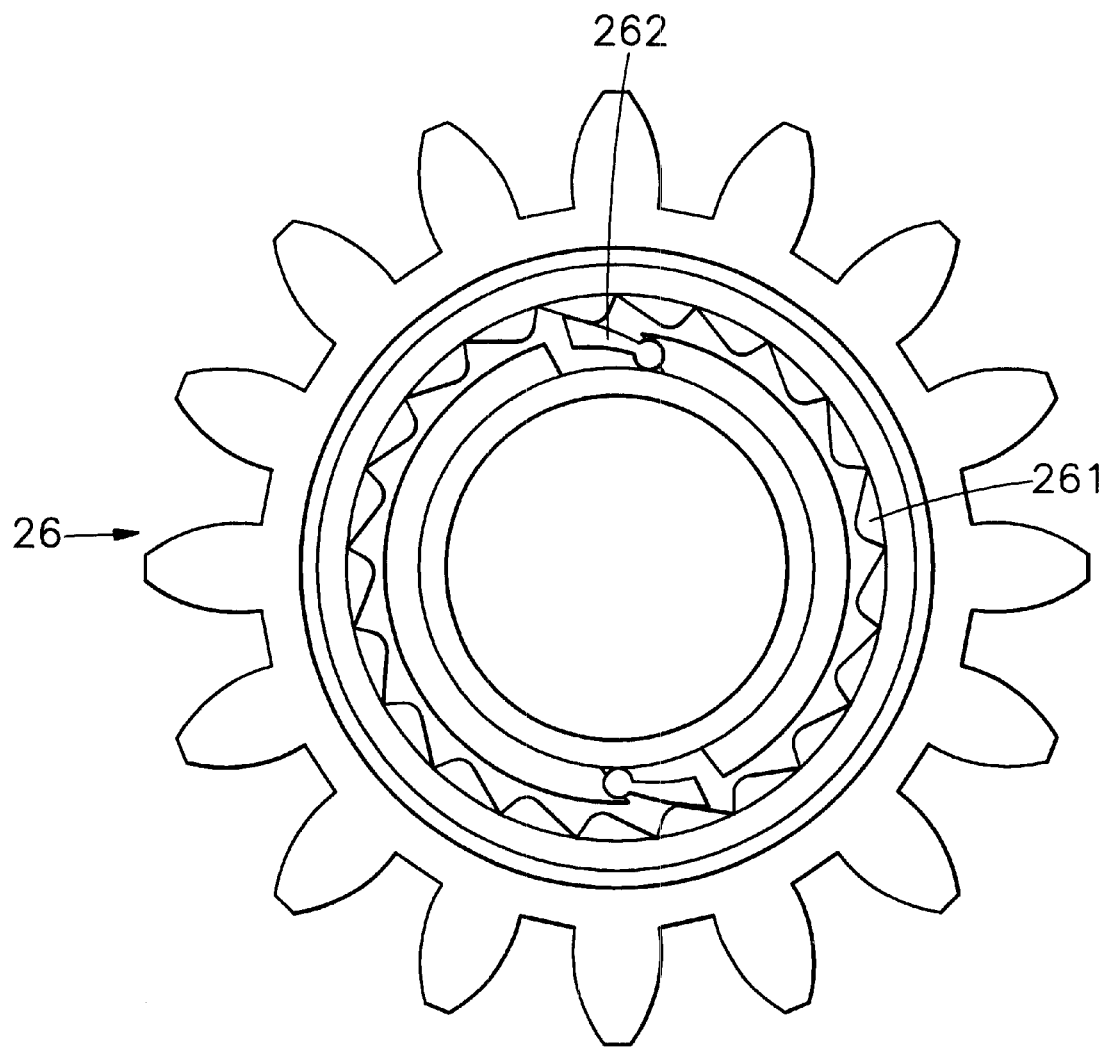
FIG. 6 illustrates the internal arrangement of the one-way gear wheel according to the present invention.

Referring to FIG. 6 and FIG. 1 again, the one-way gear wheel 26 has a serrated portion 261 around its inner diameter, and spring-supported pawls 262 are mounted on the first transmission shaft 22 and meshed with the serrated portion 261 to control the direction of rotation of the one-way. gear wheel 26. The one-way gear wheel 26 enables the motor 2 to rotate the idle wheel 3. If the revolving speed of the idle wheel 3 surpasses the first reduction gear 25, no power of rotation is transmitted from the idle wheel 3 to the first reduction gear 25, therefore the arrangement of the one-way gear wheel 3 also protects the first reduction gear 25 and the motor 2 from damage. Belt transmission means may be used to increase the torque of the motor 2 instead of the first reduction gear 25. The power generating unit 1 comprises a cable 13 for output of electricity to a power transmission unit, which is comprised of a mount 17, an instrument panel 16 mounted on the mount 17, an electric outlet 15 mounted on the mount 17 for electric power output, a switch 18 mounted on the mount 17 for on/off control, and an indicator light 14 mounted on the mount 17 for power output indication.

The magnetic field of the motor 2 is of magnet type, which saves power consumption and increases the power. Magnets may be used in the power generator 1 to enhance magnetic induction. Further, all bearings are of rounded shape to reduce friction resistance. Please refer to FIG. 4 again, the length and diameter of the links 32 of the idle wheel 3 determine the effect of the force 33 to the fulcrum 34.

The power generating system of the present invention has industrial value, and can be used in electric cars, electric motorcycles, electric trains, and etc. However, it is to be understood that the drawings are designed for purposes of illustration only, and are not intended for use as a definition of the limits and scope of the invention disclosed.

What the invention claimed is:

1. A power generating system comprising:
   a motor;
   a master idle wheel coupled to and rotated by said motor;
   a reduction gear coupled between said motor and said master idle wheel for enabling said master idle wheel to be rotated by said motor;
   a power generating unit rotated by said master idle wheel to generate electricity, said power generating unit comprising a power cable for output of generated electricity;
   a power transmission unit connected to the power cable of said power generating unit for controlling output of electricity from said power generating unit; and
   a first transmission unit coupled between said reduction gear and said master idle wheel, and a second transmission unit coupled between said master idle wheel and said power generating unit, said first transmission unit comprising an one-way gear wheel coupled to said reduction gear, a first sprocket fixedly mounted on said master idle wheel at one side thereof, and a first chain coupled between said one-way gear wheel and said first sprocket, said second transmission unit comprises a second sprocket fixedly mounted on said master idle wheel at one side opposite to the first sprocket of said first transmission unit, a third sprocket coupled to a rotor of said power generating unit, and a second chain coupled between said second sprocket and said third sprocket.

2. The power generating system of claim 1 wherein said master idle wheel comprises a wheel shaft fixedly fastened to the first sprocket and the second sprocket, the master idle wheel comprising an outer race, and a plurality of links radially connected between said wheel shaft and said outer race.

3. The power generating system of claim 1, wherein said one-way gear wheel comprises a- serrated portion around an inner diameter thereof, and at least one spring-supported pawl meshed with said serrated portion to control the direction of rotation of said one-way gear wheel.

4. The power generating system of claim 1, wherein said power transmission unit comprises a mount, an instrument panel mounted on said mount, an electric outlet mounted on said mount for electric power output, a switch mounted on said mount for on/off control, and an indicator light mounted on said mount for power output indication.

5. The power generating system of claim 1, wherein said motor is a magnet design adapted for producing a magnetic field.

6. The power generating system of claim 1, wherein said power generating unit uses magnets to enhance magnetic induction.

7. The power generating system of claim 1, wherein said second transmission unit further comprises a second reduction gear coupled between said third sprocket and the rotor of said power generating unit.

8. The power generating system of claim 1, wherein said power transmission unit is connected to a power circuit of an electric motor vehicle.

\* \* \* \* \*